United States Patent
Arakawa et al.

(10) Patent No.: US 10,581,303 B2
(45) Date of Patent: Mar. 3, 2020

(54) LAMINATED IRON CORE AND MANUFACTURING METHOD OF LAMINATED IRON CORE

(71) Applicant: MITSUI HIGH-TEC, INC., Kitakyushu-shi, Fukuoka (JP)

(72) Inventors: Hirokazu Arakawa, Fukuoka (JP); Takashi Maruyama, Fukuoka (JP); Kenichi Takasaki, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 570 days.

(21) Appl. No.: 15/075,263

(22) Filed: Mar. 21, 2016

(65) Prior Publication Data

US 2016/0285325 A1   Sep. 29, 2016

(30) Foreign Application Priority Data

Mar. 27, 2015 (JP) .................................. 2015-066468

(51) Int. Cl.
*B21D 28/22* (2006.01)
*H02K 15/02* (2006.01)

(52) U.S. Cl.
CPC .............. *H02K 15/02* (2013.01); *B21D 28/22* (2013.01)

(58) Field of Classification Search
CPC ........ B21D 28/14; B21D 28/16; B21D 28/22; H02K 15/02
USPC .................................................. 72/330, 337
See application file for complete search history.

(56) References Cited

U.S. PATENT DOCUMENTS

| 5,365,132 | A | 11/1994 | Hann et al. |
| 5,539,974 | A * | 7/1996 | Isayama ................. H02K 15/02 29/596 |
| 5,942,831 | A | 8/1999 | Yamada et al. |
| 6,177,749 | B1 | 11/2001 | Hussey et al. |
| 2006/0108891 | A1 | 5/2006 | Fujita |

FOREIGN PATENT DOCUMENTS

| CN | 1156317 | 8/1997 |
| CN | 1321352 | 7/2001 |
| CN | 1705184 | 12/2005 |
| CN | 100416988 | 9/2008 |

(Continued)

OTHER PUBLICATIONS

Chinese Official Action issued in Application No. 201610183529.0, dated Jul. 11, 2018 and English translation thereof.

(Continued)

*Primary Examiner* — Debra M Sullivan
(74) *Attorney, Agent, or Firm* — Greenblum & Bernstein, P.L.C.

(57) ABSTRACT

A laminated iron core includes a plurality of blanked iron core pieces laminated together, a continuity of side parts of the iron core pieces configuring a side surface of the laminated iron core. The side part of each iron core piece includes a specific light reflection area having a prescribed width along a circumferential direction, where the specific light reflection area has different light reflection characteristics from the other area of the side part of the iron core piece, and a striped pattern, configured by the specific light reflection areas, exists on the side surface of the laminated iron core.

8 Claims, 9 Drawing Sheets

(56) References Cited

FOREIGN PATENT DOCUMENTS

| | | |
|---|---|---|
| EP | 2 819 274 | 6/2013 |
| JP | 56-102943 | 8/1981 |
| JP | 64-9437 | 1/1989 |
| JP | 4-334951 | 11/1992 |
| JP | 2000-264795 | 9/2000 |
| JP | 2007-159300 | 6/2007 |
| JP | 2008-264795 | 11/2008 |

OTHER PUBLICATIONS

Office Action issued in Japan Counterpart Patent Appl. No. 2015-066468, dated Nov. 27, 2018, along with an English translation thereof.

Office Action issued in Japan Counterpart Patent Appl. No. 2015-066468, dated Apr. 2, 2019, along with an English translation thereof.

* cited by examiner

PRIOR ART

FIG.9B

PRIOR ART

LAMINATED IRON CORE AND MANUFACTURING METHOD OF LAMINATED IRON CORE

CROSS REFERENCE TO RELATED APPLICATION(S)

This application is based upon and claims the benefit of priority of Japanese Patent Application No. 2015-66468 filed on Mar. 27, 2015, the contents of which are incorporated herein by reference in its entirety.

BACKGROUND OF THE INVENTION

1. Field of the Invention

The present invention relates to a laminated iron core and a manufacturing method, of a laminated iron core. In particular, the present invention relates to a laminated iron core and a manufacturing method of a laminated iron core in which when the laminated iron core is manufactured by using multiple iron core pieces taken from a steel plate, sources of the iron core pieces are easily recognized, when the iron core pieces are turned and laminated to manufacture the laminated iron core, a turned, and laminated state of the iron core pieces is easily recognized, or when the iron core pieces are skewed to manufacture the laminated iron core, the skew is easily recognized.

2. Description of the Related Art

Figure 9A:
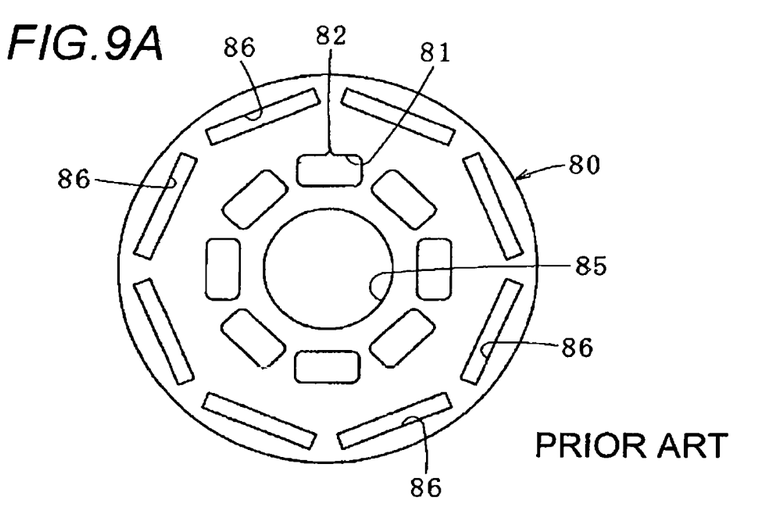
FIGS. 9A and 9B are plan views of an iron core piece according to a usual example.
Figure 9B:
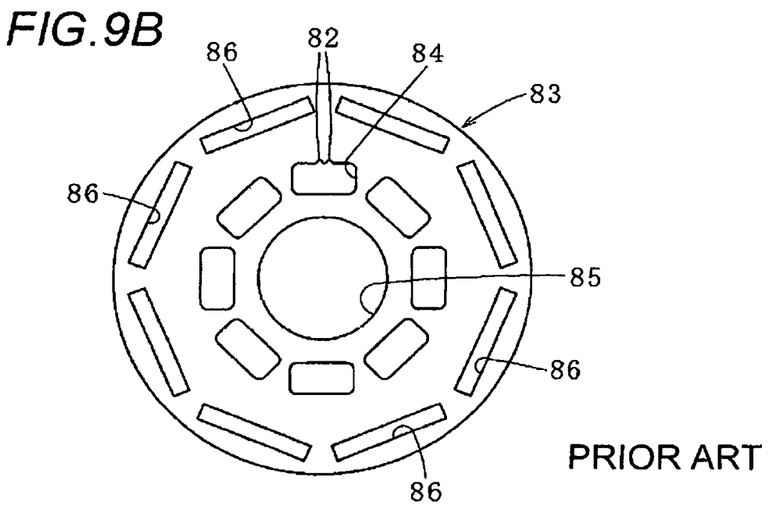

The laminated iron core forming an electric motor or a generator is manufactured in such a way that iron core pieces blanked or stamped out from a steel plate are laminated. At that time, in order to improve a productivity or a yield, a blanking die unit layout may he sometimes used that a plurality of iron core pieces are blanked out and formed from one steel plate at the same time (namely, the multiple iron core pieces are taken). When the multiple iron core pieces are taken from the steel plate, which row where the iron core piece forming the laminated iron core is blanked needs to be identified (Namely, the source of the iron core piece is recognized) in order to recognize the quality of the manufactured laminated iron core. Accordingly, in each row that the iron core is blanked or stamped out, a part of a configuration of the iron core piece is changed (for instance, small irregularities or cut-out parts are provided in a part of an outer peripheral part or an inner peripheral part of the iron core piece) to identify which row where the iron core piece is blanked out. For instance, two rows of the iron core pieces are taken from the steel plate, as shown in FIGS. 9A and 9B, in one iron core piece 80 which is blanked out from the one row, one recessed part 82 is formed in an edge part of one through hole 81 of a plurality of through holes formed for cooling. In an iron core piece 83 which is blanked out from the other row, two recessed parts 82 are formed in an edge part of one through hole 84 of a plurality of through holes. FIGS. 9A and 9B also show a shaft hole 85 and a magnet-insert hole 86.

For the purpose of improving a property of the laminated iron core, in an inner part of a blanking die unit or in an outer part of the blanking die unit, the blanked iron core pieces may be sometimes turned, and laminated or the iron core pieces may be turned and laminated while skewing. In this case, the turned and laminated state of the iron core pieces or whether or not the skew is assuredly applied to the iron core pieces to laminate the iron core pieces needs to be recognized. At that time, when a configuration of the iron core piece is symmetrical in rotation, a recognition work cannot be done by a method of an examination of an external appearance of the laminated iron core. For instance, JP-U-64-9437 as Patent Literature 1 discloses that a quantity of skew detecting remark is provided in one or a plurality of positions in an outer peripheral part of the iron core piece (namely, a part of the configuration of the iron core piece is changed).

Patent Literature 1: JP-U-64-9437

SUMMARY OF THE INVENTION

However, as described above, when a special machining work is to be applied to a part of the outer peripheral part or the inner peripheral part of the iron core piece to change the configuration, below-described problems arise.

1) Symmetrical property in rotation of the iron core piece collapses which causes a weight unbalance to be generated in the formed laminated iron core.
2) When the iron core piece has a configuration in which the special machining work is applied only to the outer peripheral part, for a product (for instance, a rotor of an induction motor or the like) in which the cut-out part is hardly formed in its outer peripheral part, the special machining work cannot be applied thereto.
3) Since blanking tools (a blanking punch and a blanking die unit) for the special machining work are necessary, the number of components of the blanking die unit is increased to increase a die manufacturing cost.
4) A machining method (a manufacturing method) of the blanking tools which carry out the special machining work is limited. For instance, when an outer configuration of the blanking tools is a true circle, a cylindrical grinding work or a wire electric discharge machining work may be applied thereto. However, when a cut-out part is partly provided in the outer peripheral part of the blanking tools, the machining method is limited to the wire electric discharge machining work.

The present invention is devised by considering the above-described circumstances, and it is a non-limited object of the present invention to provide a laminated iron core and a method of a laminated iron core in which rows can be easily recognized where multiple iron core pieces taken from a steel plate are blanked or stamped or a turned and laminated state or skew of the iron core pieces can be easily recognized.

A first aspect of the present invention provides a laminated iron core including: a plurality of blanked iron core pieces laminated together, a continuity of side parts of the iron core pieces configuring a side surface of the laminated iron core, wherein the side part of each iron core piece includes a specific light reflection area having a prescribed width along a circumferential direction, where the specific light reflection area has different light reflection characteristics from the other area of the side part of the iron core piece, and a striped pattern, configured by the specific light reflection areas, exists on the side surface of the laminated iron core.

When the iron core pieces are laminated while being blanked, the striped pattern is configured by the specific reflection areas being consecutive in a direction of lamination. When the iron core pieces are turned and laminated for each piece, the striped pattern is configured by the specific light reflection areas arranged at intervals of prescribed angles along the circumferential direction. When the iron core pieces are turned and laminated for each set of pieces, the striped pattern is configured by the specific light reflection areas being consecutive along a direction of lamination for each set, and arranged at intervals of prescribed angles along the circumferential direction on the set basis.

When the iron core pieces are laminated while being skewed, the striped pattern is configured by the specific light reflection areas being consecutive along a direction of lamination with their angular positions in the circumferential direction gradually changed.

A second aspect of the present invention provides a manufacturing method of a laminated iron core manufactured by laminating blanked iron core pieces together, the manufacturing method including: providing a first blanking tool which determines a product configuration of the iron core pieces and a second blanking tool paired with the first blanking tool, wherein a clearance formed between the first and second blanking tools is partly enlarged by providing a recessed part in a part of a surface of the second blanking tool; and blanking a steel plate by the first and second blanking tools with the clearance to partly change a ratio of formation of a shearing surface layer to a broken surface layer which are formed in a form of layers along a blanking direction in a side part of each iron core piece, to thereby form a specific light reflection area having a prescribed width and different light reflection characteristics from the other area of the side part of the iron core piece.

In the laminated iron core according to the first aspect of the present invention and the manufacturing method of the laminated iron core according to the second aspect of the present invention, when the multiple iron core pieces are taken from one steel plate to manufacture the laminated iron core, the specific light reflection area is provided only in the iron core piece blanked from a specific row, or positions, widths or the number of the specific light reflection areas provided in the multiple iron core pieces taken from the steel plate are changed respectively for each of the rows. Thus, even when the configuration of the iron core piece is not changed as in the usual laminated iron core, from which rows the iron core pieces are blanked out, can be identified, that form the laminated iron core from a presence or absence of a striped pattern, a position of the striped pattern or the number of the striped patterns.

Further, the specific light reflection areas are supposed to be formed, for instance, in outer side parts of the iron core pieces. When the iron core pieces are turned by prescribed angles and laminated (turned and laminated), since the positions (angular positions in a circumferential direction and positions in a direction of lamination) of the specific light reflection areas are changed in accordance with a turning and laminating operation, the formed striped pattern is also changed. When the angular positions of the striped patterns adjacent in the circumferential direction are examined, the turned and laminated state of the iron core pieces can be easily recognized. When the iron core pieces are skewed and laminated, the striped pattern is formed in which the specific light reflection areas are continuous in the outer side surface of the laminated iron core with their angular positions in the circumferential direction gradually changed. Thus, when an angle of inclination of the striped pattern is observed, the skew can be easily recognized.

DETAILED DESCRIPTION OF THE EXEMPLARY EMBODIMENTS

Subsequently, by referring to the accompanying drawings, exemplary embodiments which embody the present invention will be described to understand the present invention.

Figure 1A:
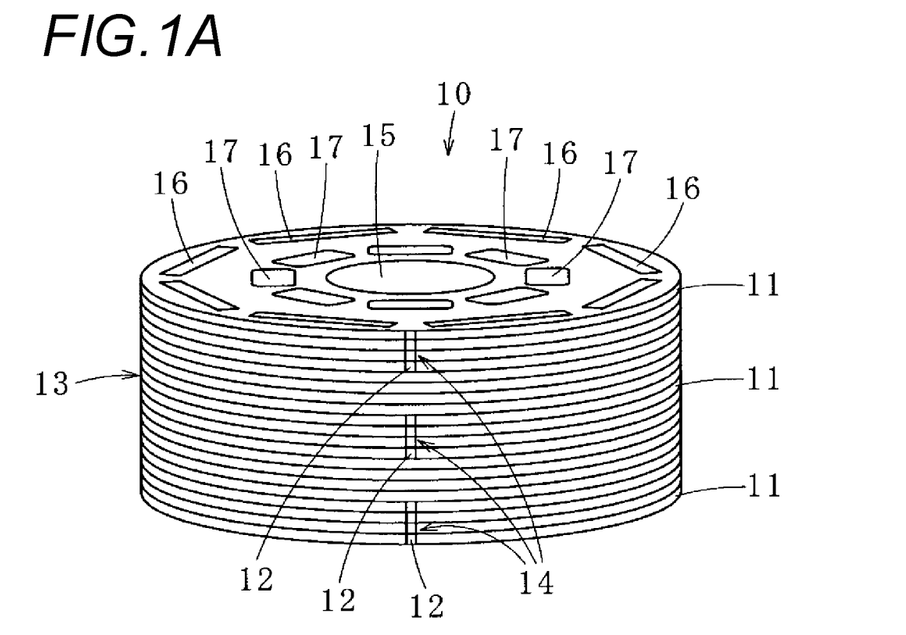
FIGS. 1A and 1B respectively show perspective views of laminated iron cores of a first exemplary embodiment and a second exemplary embodiment of the present invention.

A laminated iron core 10 according to a first exemplary embodiment of the present invention shown in FIG. 1A is manufactured by carrying out a lamination (a turning and laminating operation) that every time a plurality (N sheets) of iron core pieces 11 circular in plan view are laminated, the iron core pieces are turned by 180°. Here, specific light reflection areas 12 having different light reflection characteristics from other areas and prescribed widths, for instance, widths of 0.5 to 1.5 mm are provided along a circumferential direction in side parts of the iron core pieces 11. As a result, on a side surface 13 (formed in such a way that the side parts of the iron core pieces 11 are continued in a direction of lamination) of the laminated iron core 10 formed by laminating the iron core pieces 11, striped patterns 14 are intermittently provided that are formed in such a way that N pieces of specific light reflection areas 12 are continuously arranged in the direction of lamination at intervals of 180° along the circumferential direction.

FIG. 1A shows a shaft hole 15 of the laminated iron core 10, a magnet-insert hole 16, and a cooling hole 17 formed in the laminated iron core 10.

Figure 1B:
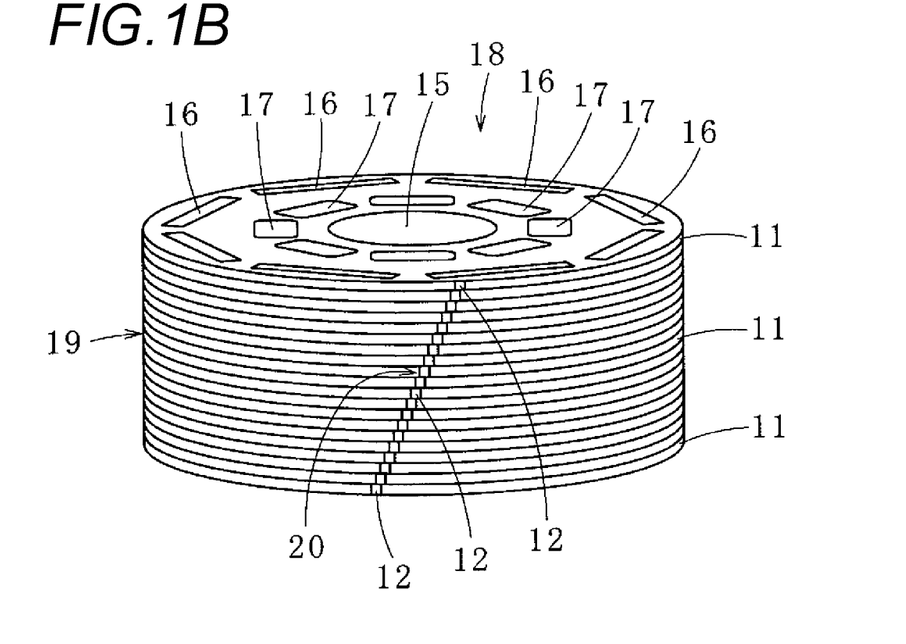

A laminated iron core 18 according to a second exemplary embodiment of the present invention shown in FIG. 1B is manufactured in such a way that iron core pieces 11 are skewed and laminated at the same time. As a result, on a side surface 19 of the laminated iron core 18 formed by the continuity of side parts of the iron core pieces 11, a striped pattern 20 is provided which is formed in such a manner that specific light reflection areas 12 are continuously arranged in a direction of lamination by gradually changing their angular positions in a circumferential direction (the specific light reflection areas are shifted at angles of rotation applied when skewing).

Figure 2A:
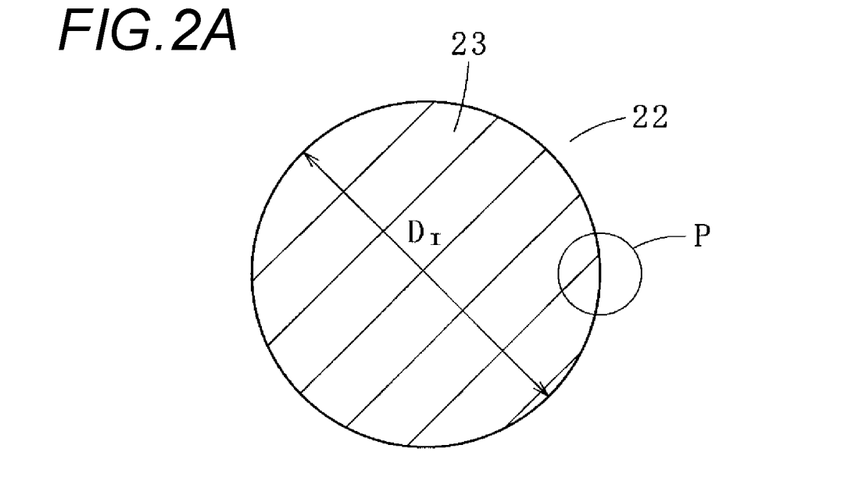
FIG. 2A is a plan view showing a relation between a blanking punch and a blanking die unit used to blank an outer shape of an iron core piece used for manufacturing the laminated iron core.
Figure 2B:
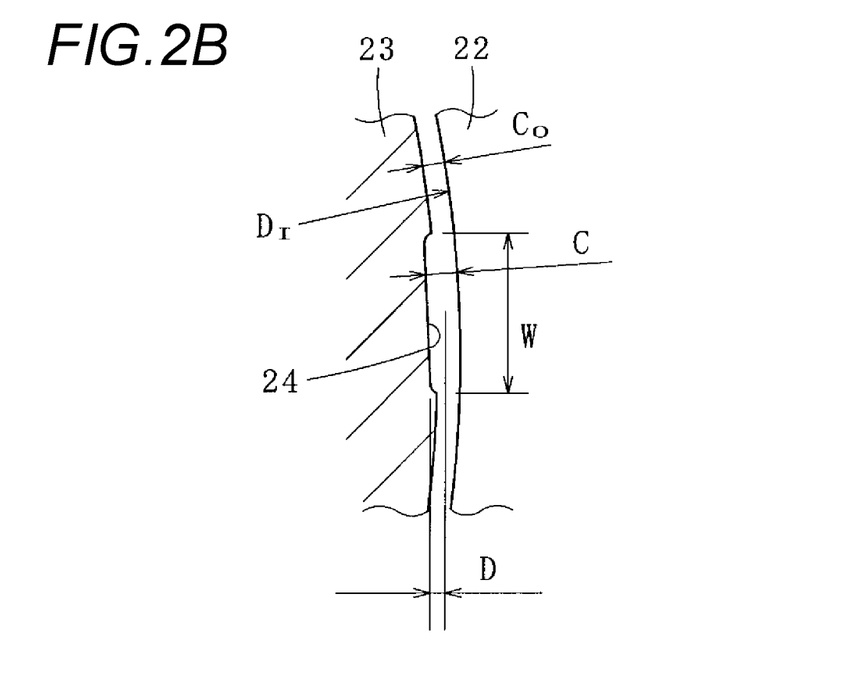
FIG. 2B is an enlarged view of a part P in FIG. 2A.

In a manufacturing method of the laminated iron cores 11 and 18 according to the first and second exemplary embodiments, for a blanking die unit 22 (one example of a first blanking tool) and a blanking punch 23 (one example of a second blanking tool) paired with the blanking the unit 22 which are used to blank and form the iron core pieces 11 from a steel plate 21 (see FIGS. 3A and 3B), as shown in FIG. 2A, an inside diameter dimension $D_1$ of the blanking die unit 22 which determines an outer shape (one example of a product configuration) of the iron core piece 11 is allowed to match with an outside diameter dimension of the iron core piece 11. As shown in FIG. 2B, a recessed part 24 is provided in a part of a surface (an outer peripheral part) of the blanking punch 23. Thus, a clearance C which is formed between a bottom surface of the recessed part 24 on the surface of the blanking punch 23 and an inner peripheral surface of the blanking die unit 22 is enlarged more than a clearance $C_0$ formed between a non-recessed part of the surface (the outer peripheral part) of the blanking punch 23 and the inner peripheral surface of the blanking die unit 22. Here, a width W of the recessed part 24 is set to, for instance, 0.5 to 1.5 mm. Further, when a thickness of the steel plate 21 is supposed to be set to t, the clearance $C_0$ is set to, for instance, 0.05t to 0.2t. A depth D of the recessed part 24 is set to, for instance, 0.05t to 0.5t. Accordingly, the clearance C is set to 0.1 t to 0.7 t.

Figure 3A:
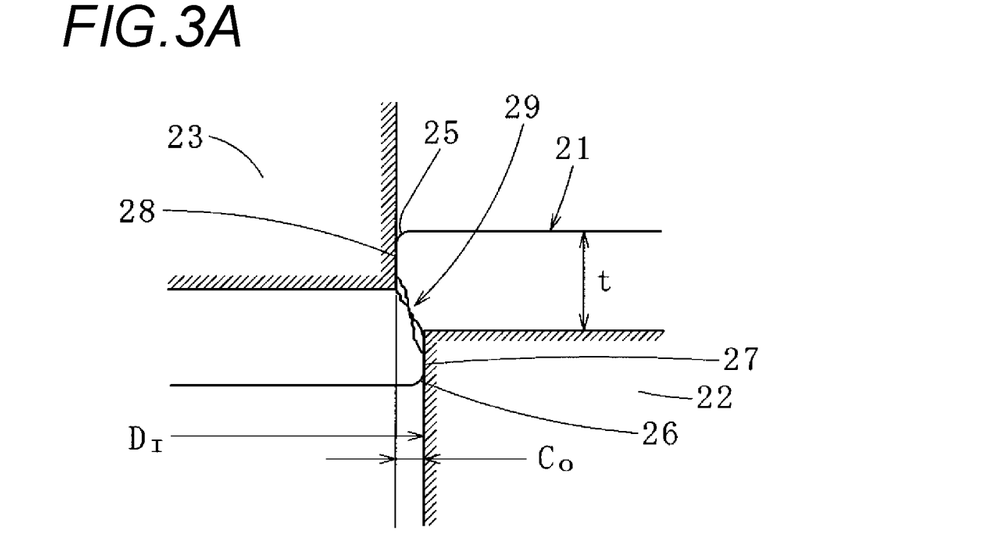
FIG. 3A is a schematic view showing a state when a steel plate is blanked by the blanking die unit and a non-recessed part of the blanking punch.
Figure 3B:
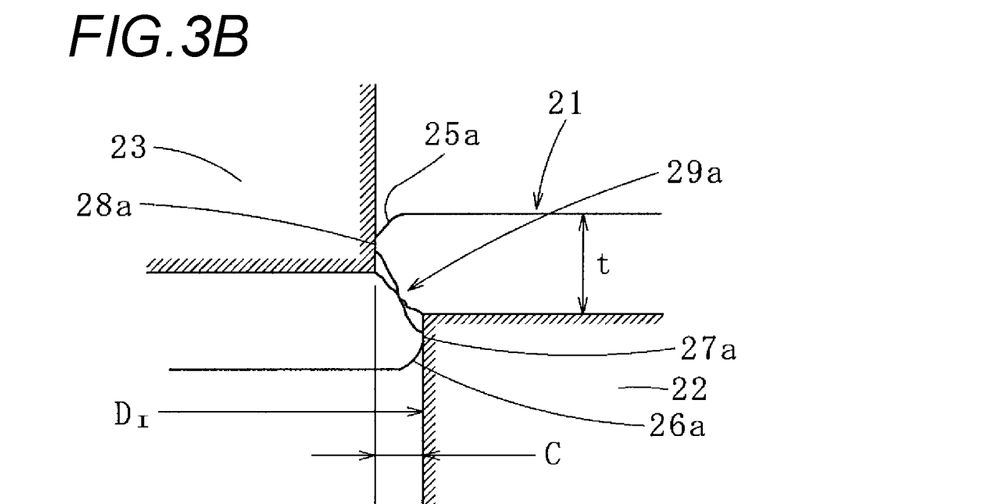
FIG. 3B is a schematic view showing a state that the steel plate is blanked by the blanking the unit and a recessed part of the blanking punch.

In a case where the outer shape of the iron core piece 11 is blanked out from the steel plate 21 by using the blanking die unit 22 and the blanking punch 23, when the blanking punch 23 is lowered, the blanking punch 23 comes into contact with the steel plate 21. A cutting edge of the blanking punch 23 and a cutting edge of the blanking die unit 22 respectively bite the steel plate 21. At this time, as shown in FIG. 3A, in an area of the clearance $C_0$ (between the non-recessed part of the surface of the blanking punch 23 and the inner peripheral surface of the blanking die unit 22), sags 25 and 26 are formed respectively in a front surface side of the steel plate 21 (the blanking punch 23 side) and a back surface side (the blanking die unit 22 side) of the steel plate 21. As shown in FIG. 3B, in an area of the clearance C (between the recessed part 24 on the surface of the blanking punch 23 and the inner peripheral surface of the blanking die unit 22), sags 25a and 26a are formed respectively in the front surface side (the blanking punch 23 side) and the back surface side (the blanking die unit 22 side) of the steel plate 21. Widths of the sags 25a and 26a generated in the area of the clearance C are larger than widths of the sags 25 and 26 generated in the area of the clearance $C_0$.

Further, when the blanking punch 23 is lowered, a steel plate material in the vicinity of the cutting edge of the blanking die unit 22 and the cutting edge of the blanking punch 23 collapses. The cutting edge of the blanking die unit 22 and the cutting edge of the blanking punch 23 respectively generate a shearing deformation in the steel plate material and deeply bite the steel plate material. As a result, as shown in FIG. 3A, in the area of the clearance $C_0$, the steel plate material comes into contact with the inner peripheral surface of the blanking die unit 22 to form a shearing surface 27, and comes into contact with the outer peripheral surface of the blanking punch 23 to form a shearing surface 28, respectively. As shown in FIG. 3B, in the area of the clearance C, the steel plate material comes into contact with the inner peripheral surface of the blanking die unit 22 to form a shearing surface 27a, and comes into contact with the bottom surface of the recessed part 24 of the blanking punch 23 to form a shearing surface 28a, respectively.

When the blanking punch 23 is lowered more so that the cutting edge of the blanking die unit 22 and the cutting edge of the blanking punch 23 respectively bite more deeply the steel plate material, a work hardening is generated in the steel plate material to increase a shearing force. Thus, cracks are generated respectively in the vicinity of the cutting edges of the blanking die unit 22 and the blanking punch 23. As shown in FIGS. 3A and 3B, the cracks grow to be combined together, so that broken surfaces 29 and 29a are formed to blank out the outer shape of the iron core piece 11 from the steel plate 21. Here, in the side part of the iron core piece 11, the shearing surfaces 27 and 27a are most protrude outward in a radial direction. Since the shearing surfaces 27 and 27a are formed in such a way that the cutting edge of the blanking die unit 22 is allowed to bite the steel plate material, the shearing surfaces 27 and 27a exist on the same circumference. Even when the recessed part 24 is provided in a part of the surface of the blanking punch 23, the configuration of the iron core piece 11 is not changed.

Figure 4A:
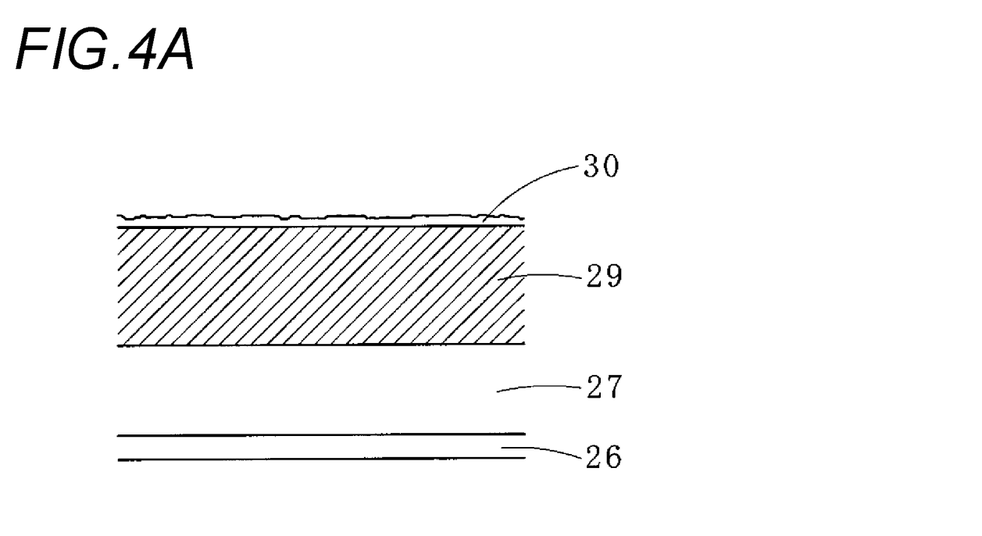
FIG. 4A is a schematic view showing a state of a side part of the iron core piece which is blanked by the non-recessed part of the blanking punch.
Figure 4B:
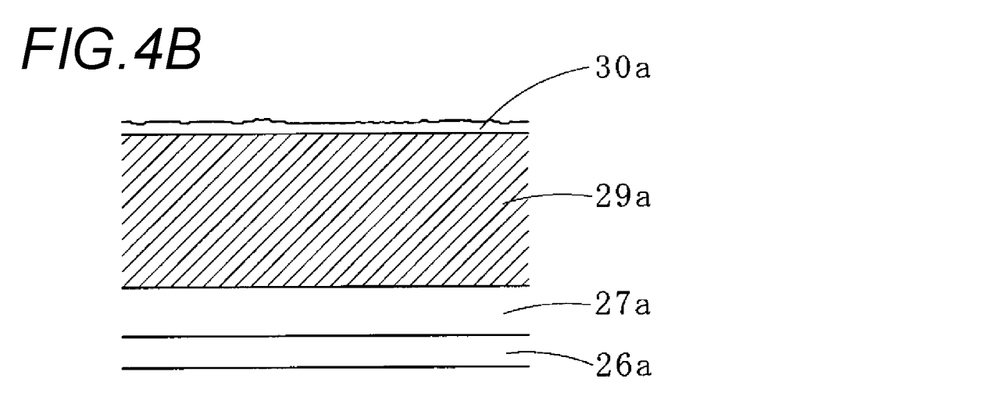
FIG. 4B is a schematic view showing a state of the side part of the iron core piece which is blanked by the recessed part of the blanking punch.

Here, as shown in FIGS. 4A and 4B, the width of the sag 26a generated in the area of the clearance C is larger than the width of the sag 26 generated in the area of the clearance $C_0$ (the same as a relation between the sags 25 and 25a). Thus, in the area of the clearance C, the work hardening is generated more early than that in the area of the clearance $C_0$. Accordingly, a width of the shearing surface 27a (a width along a lowering direction of the blanking punch 23) is smaller than a width of the shearing surface 27 (the same as a relation between the shearing surfaces 28 and 28a). As a result, a width of the broken surface 29a is larger than a width of the broken surface 29. Burrs 30 and 30a are generated when the iron core piece 11 is blanked out.

As shown in FIGS. 4A and 4B, in the side part of the iron core piece 11, in an area formed correspondingly to the area of the clearance $C_0$, a layer of the shearing surface 27 and a layer of the broken surface 29 exist which are formed in configurations of layers along a blanking direction of the blanking punch 23. In an area formed correspondingly to the area of the clearance C, a layer of the shearing surface 27a and a layer of the broken surface 29a exist which are formed in configurations of layers along the blanking direction of the blanking punch 23. Here, the layer of the shearing surface 27 is larger than the layer of the shearing surface 27a in its width. The layer of the broken surface 29 is smaller than the layer of the broken surface 29a in its width. Accordingly, a ratio of formation of the layer of the broken surface 29a to the layer of the shearing surface 27a in the area formed correspondingly to the area of the clearance C is larger than a ratio of formation of the layer of the broken surface 29 to the layer of the shearing surface 27 in the area formed correspondingly to the area of the clearance $C_0$.

Since the shearing surfaces 27 and 27a are flat surfaces, lights incident on the shearing surfaces 27 and 27a are reflected toward specific directions determined by directions on which the lights are incident. However, since many microscopic surfaces which are directed to various directions exist in the broken surfaces 29 and 29a, lights incident on the broken surfaces 29 and 29a are irregularly reflected.

Accordingly, in the side part of the iron core piece 11, when the lights are respectively incident on an area with a prescribed width having the shearing surface 27a and the broken surface 29a along the circumferential direction and a remaining area having the shearing surface 27 and the broken surface 29, a ratio of existence of the broken surface in the area with the prescribed width is higher than that in the remaining area, so that a difference arises in a state of irregular reflection of the lights (one example of the light reflection characteristics). Accordingly, in the side part of the iron core piece 11, the area with the prescribed width having the shearing surface 27a and the broken surface 29a serves as the specific light reflection area 12.

When the iron core pieces 11 are laminated to manufacture the laminated iron cores 10 and 18, on the side surfaces 13 and 19 of the laminated iron cores 10 and 18, the specific light reflection areas 12 are continuously arranged in the direction of lamination. Accordingly, the lights are allowed to be incident on the side surfaces 13 and 19 of the laminated iron cores 10 and 18 and the side surfaces 13 and 19 of the laminated iron cores 10 and 18 are observed from directions deviating from light reflection directions by the shearing surfaces 27 and 27a. Thus, since the state of the light irregular reflection is distinguished in a range where the specific light reflection areas 12 are continuously arranged along the direction of lamination, one bright striped pattern 14 and 20 are recognized which have substantially the same width as that of the specific light reflection area 12.

Thus, in the laminated iron core 10, when the angular positions of the striped patterns 14 in the circumferential direction which exist in the side surface 13 of the laminated iron core 10 are examined, the turned and laminated states of the iron core pieces 11 can be easily recognized. In the laminated iron core 18, when the angle of inclination of the striped pattern 20 in the direction of lamination which exists in the side surface 19 of the laminated iron core 18 is examined, the skew applied to the iron core pieces 11 can be easily recognized. In order to form the specific light reflection areas 12, the recessed part 24 may be merely provided in a part of the surface of the blanking punch 23 as the blanking tool B. Thus, the blanking punch 23 can be easily machined.

Further, in the side surfaces 13 and 19 of the laminated iron cores 10 and 18, a part in which the striped patterns 14 and 20 are generated is merely different from a part in which the striped patterns 14 and 20 are not generated in a ratio of a total area of the shearing surfaces to a total area of the broken surfaces which appear in the side surfaces 13 and 19. A configuration (dimension) does not change. Accordingly, a change of design due to the change of the configuration does not arise. A deterioration of the quality of a product (for instance, a weight unbalance which is caused by a collapse of a symmetrical property in rotation) does not occur.

Figure 5A:
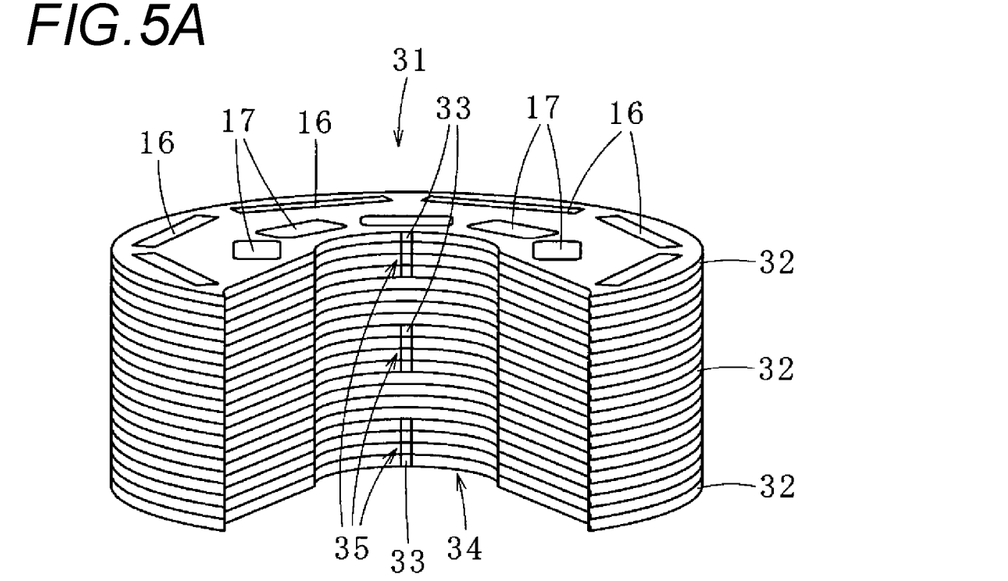
FIGS. 5A and 5B respectively show partly cut-out perspective views of laminated iron cores according to third and fourth exemplary embodiments of the present invention.

A laminated iron core 31 according to a third exemplary embodiment of the present invention shown in FIG. 5A is manufactured by carrying out a lamination (a turning and laminating operation) that every time a plurality (N sheets) of iron core pieces 32 are laminated, the iron core pieces 32 are turned by 180°. Here, specific light reflection areas 33 having different light reflection characteristics from the other area and prescribed widths, for instance, widths of 0.5 to 1.5 mm are provided along a circumferential direction in side parts of through holes formed in central parts of the iron core pieces 32. As a result, on a side surface 34 of a shaft hole (formed in such a way that the side parts of the through holes formed in the iron core pieces 32 are continued in a direction of lamination) of the laminated iron core 31 formed by laminating the iron core pieces 32, striped patterns 35 are intermittently provided that are formed in such a way that N pieces of specific light reflection areas 33 are continuously arranged at intervals of 180° in the circumferential direction along the direction of lamination.

Figure 5B:
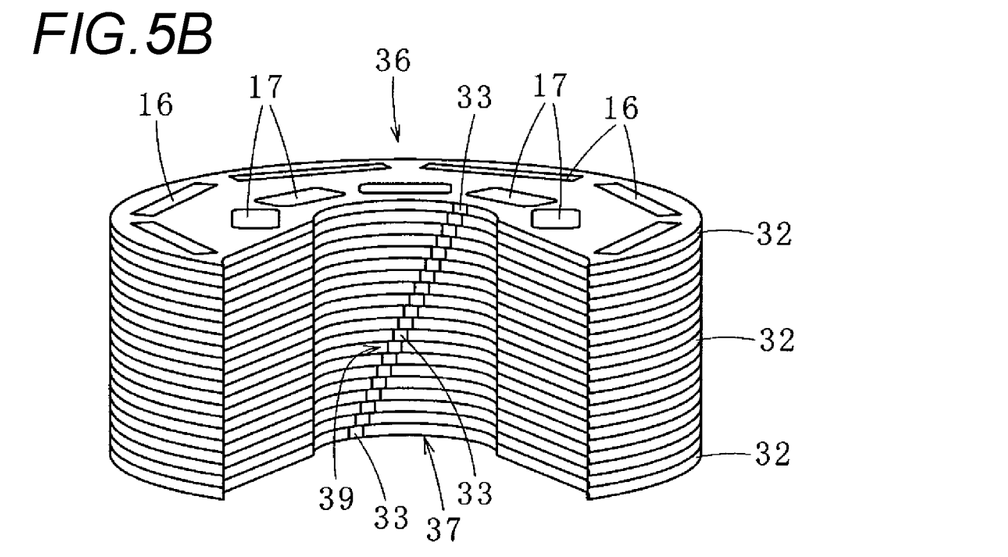

A laminated iron core 36 according to a fourth exemplary embodiment of the present invention shown in FIG. 5B is manufactured in such a way that skew is applied to iron core pieces 32 and the iron core pieces 32 are laminated at the same time. As a result, on a side surface 37 of a shaft hole of the laminated iron core 36 formed by the continuity of side parts of through holes formed in central parts of the iron core pieces 32, a striped pattern 39 is provided which is formed in such a manner that specific light reflection areas 33 are continuously arranged in a direction of lamination by gradually changing their angular positions in a circumferential direction (the specific light reflection areas are shifted at angles of rotation applied when skewing).

Figure 6A:
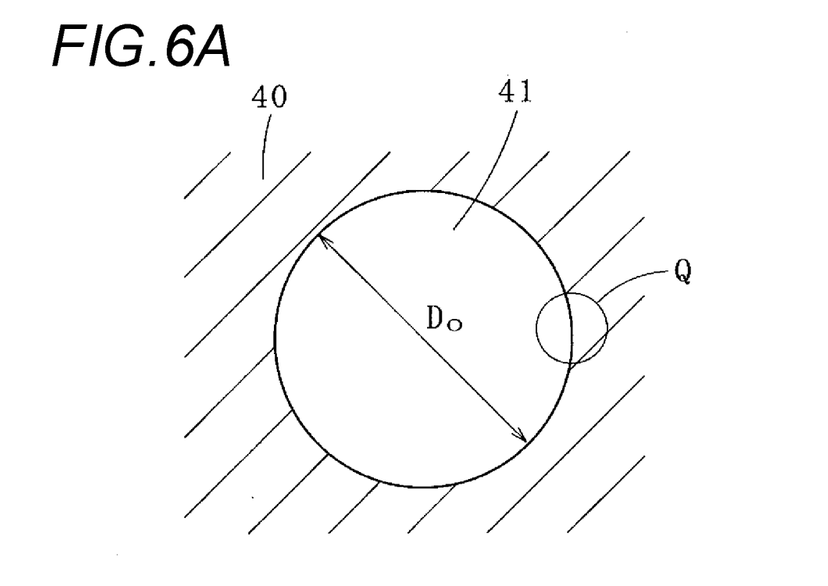
FIG. 6A is a plan view showing a relation between a blanking punch and a blanking die unit used to blank an inner shape of an iron core piece used for manufacturing the laminated iron core.
Figure 6B:
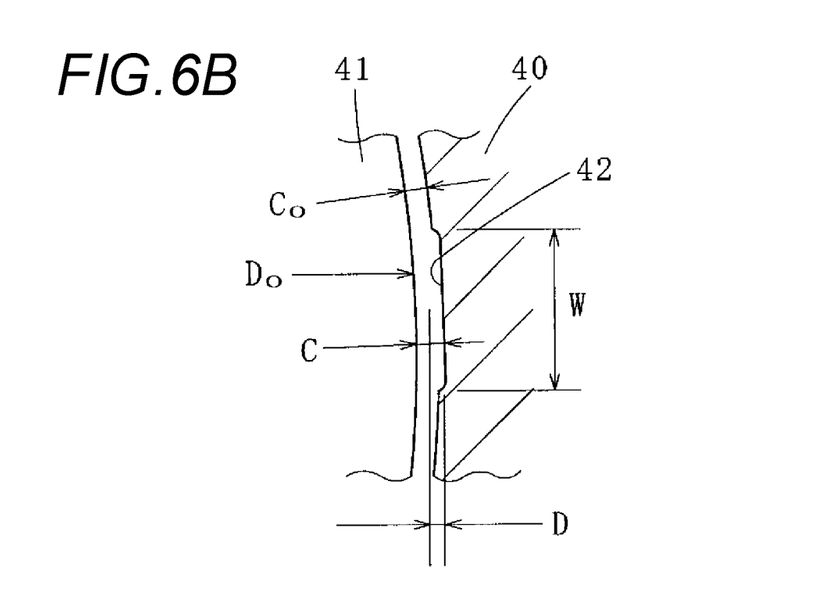
FIG. 6B is an enlarged view of a part Q in FIG. 6A.

In a manufacturing method of the laminated iron cores 31 and 36 according to the third and fourth exemplary embodiments, for a blanking die unit 40 (one example of a second blanking tool) and a blanking punch 41 (one example of a first blanking tool) paired with the blanking die unit 40 which are used to blank and form the through holes in the central parts of the iron core pieces 32 from a steel plate 21 (see FIGS. 7A and 7B), as shown in FIG. 6A, an outside diameter dimension Do of the blanking punch 41 which determines an inner shape (one example of a product configuration) of the through hole formed in the iron core piece 32 is allowed to match with an inside diameter dimension of the through hole. As shown in FIG. 6B, a recessed part 42 is provided in a part of an inner peripheral surface (an inner peripheral part) of the blanking die unit 40. Thus, a clearance C which is formed between a bottom surface of the recessed part 42 provided in the blanking die unit 40 and an outer peripheral surface of the blanking punch 41 is enlarged more than a clearance $C_0$ formed between a non-recessed part of the inner peripheral surface of the blanking die unit 40 and the outer peripheral surface (an outer peripheral part) of the blanking punch 41. Here, a width W of the recessed part 42 is set to, for instance, 0.5 to 1.5 mm. Further, when a thickness of the steel plate 21 is supposed to be set to t, the clearance $C_0$ is set to, for instance, 0.05 t to 0.2 t. A depth D of the recessed part 42 is set to, for instance, 0.05 t to 0.5 t. Accordingly, the clearance C is set to 0.1 t to 0.7 t.

Figure 7A:
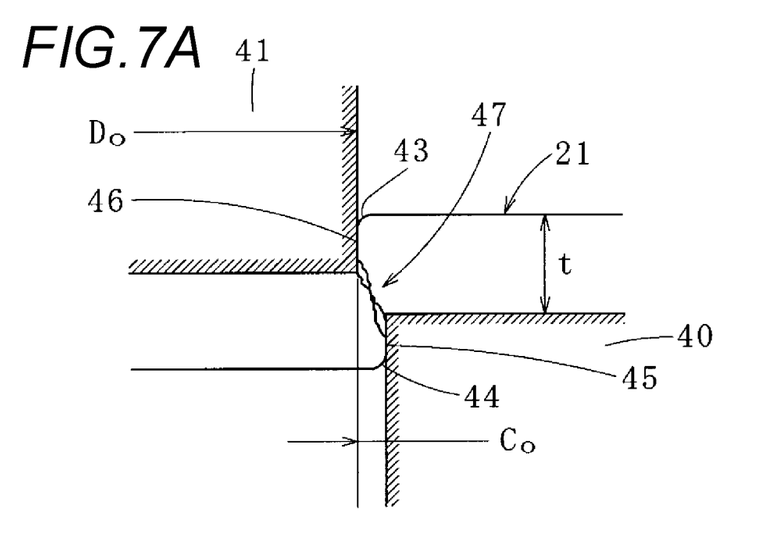
FIG. 7A is a schematic view showing a state when a steel plate is blanked by a non-recessed part of the blanking the unit and the blanking punch.
Figure 7B:
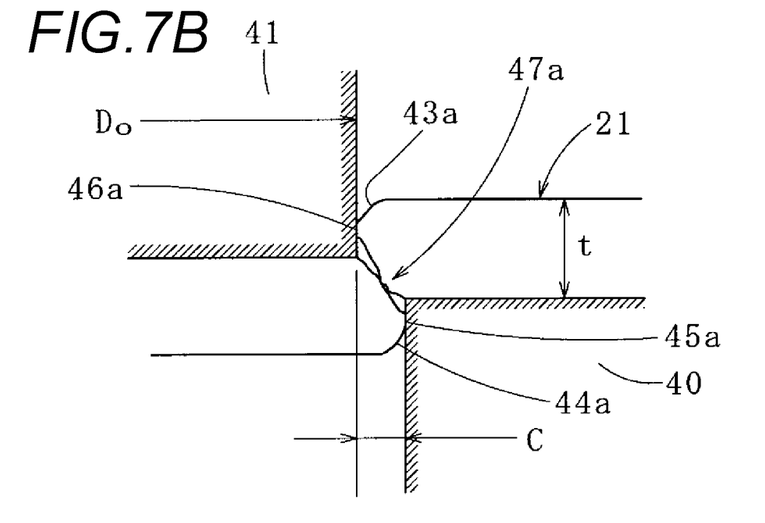
FIG. 7B is a schematic view showing a state that the steel plate is blanked by a recessed part of the blanking die unit and the blanking punch.

When an inner shape of the iron core piece 32 which has the through hole formed in the central part of the iron core piece 32 is blanked out from the steel plate 21 by using the blanking die unit 40 and the blanking punch 41, if the blanking punch 41 is lowered, the blanking punch 41 comes into contact with the steel plate 21. A cutting edge of the blanking punch 41 and a cutting edge of the blanking die unit 40 respectively bite the steel plate 21. At this time, as shown in FIG. 7A, in an area of the clearance $C_0$ formed (between the non-recessed part of the inner peripheral surface of the blanking die unit 40 and the outer peripheral surface of the blanking punch 41), sags 43 and 44 are formed respectively in a front surface side of the steel plate 21 (the blanking punch 41 side) and a back surface side (the blanking die unit 40 side) of the steel plate 21. As shown in FIG. 7B, in an area of the clearance C formed (between the bottom surface of the recessed part 42 in the inner peripheral surface of the blanking die unit 40 and the outer peripheral surface of the blanking punch 41), sags 43a and 44a are formed respectively in the front surface side (the blanking punch 41 side) and the back surface side (the blanking die unit 40 side) of the steel plate 21. Widths of the sags 43a and 44a generated in the area of the clearance C are larger than widths of the sags 43 and 44 generated in the area of the clearance $C_0$.

Further, when the blanking punch 41 is lowered, a steel plate material in the vicinity of the cutting edge of the blanking die unit 40 and the cutting edge of the blanking punch 41 collapses. The cutting edge of the blanking die unit 40 and the cutting edge of the blanking punch 41 respectively generate a shearing deformation in the steel plate material and deeply bite the steel plate material. As a result, as shown in FIG. 7A, in the area of the clearance $C_0$, the steel plate material comes into contact with the inner peripheral surface of the blanking die unit 40 to form a shearing surface 45, and comes into contact with the outer peripheral surface of the blanking punch 41 to form a shearing surface 46, respectively. As shown in FIG. 7B, in the area of the clearance C, the steel plate material comes into contact with the bottom surface of the recessed part 42 of the blanking die unit 40 to form a shearing surface 45a, and comes into contact with the outer peripheral surface of the blanking punch 41 to form a shearing surface 46a, respectively.

When the blanking punch 41 is lowered more so that the cutting edge of the blanking die unit 40 and the cutting edge of the blanking punch 41 respectively bite more deeply the steel plate material, a work hardening is generated in the steel plate material to increase a shearing force. Thus, cracks are generated respectively in the vicinity of the cutting edges of the blanking die unit 40 and the blanking punch 41. As shown in FIGS. 7A and 7B, the cracks grow to be combined together, so that broken surfaces 47 and 47a are firmed to blank out the inner shape of the iron core piece 32 (the through hole is blanked out) from the steel plate 21. Here, in the side part of through hole formed in the iron core piece 32, the shearing surfaces 46 and 46a most protrude inward in a radial direction. Since the shearing surfaces 46 and 46a are formed in such a way that the cutting edge of the blanking punch 41 is allowed to bite the steel plate material, the shearing surfaces 46 and 46a exist on the same circumference. Even when the recessed part 42 is provided in a part of the inner peripheral surface of the blanking the unit 40, the configuration of the through hole formed in the iron core piece 32 is not changed.

Figure 8A:
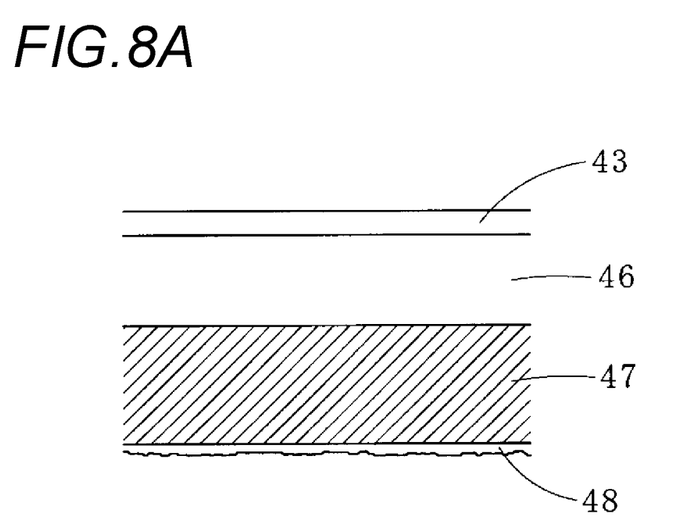
FIG. 8A is a schematic view showing a state when the inner shape is blanked in the steel plate by the non-recessed part of the blanking die unit and the blanking punch.
Figure 8B:
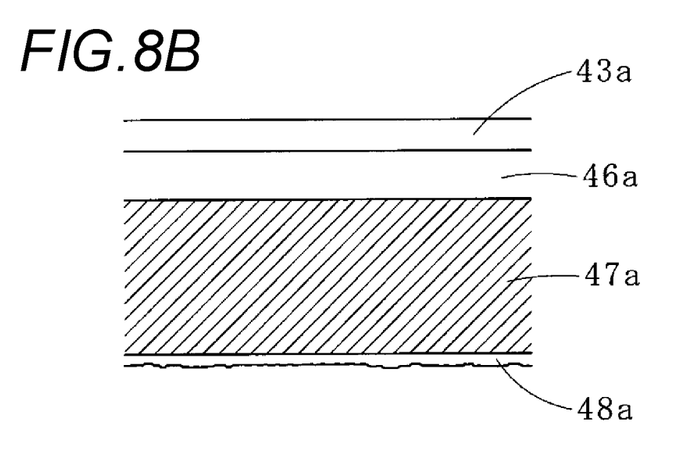
FIG. 8B is a schematic view showing a state when the inner shape is blanked in the steel plate by the recessed part of the blanking die unit and the blanking punch.

Here, as shown in FIGS. 8A and 8B, the width of the sag 43a generated in the area of the clearance C is larger than the width of the sag 43 generated in the area of the clearance $C_0$ (the same as a relation between the sags 44 and 44a). Thus, in the area of the clearance C, the work hardening is generated more early than that in the area of the clearance $C_0$. Accordingly, a width of the shearing surface 46a (a width along a lowering direction of the blanking punch 41) is smaller than a width of the shearing surface 46 (the same as a relation between the shearing surfaces 45 and 45a). As a result, a width of the broken surface 47a is larger than a width of the broken surface 47. Reference numerals 48 and 48a designate burrs generated when the through hole is blanked out and formed.

On the side part of the through hole of the iron core piece 32, in an area formed correspondingly to the area of the clearance $C_0$, a layer of the shearing surface 46 and a layer of the broken surface 47 exist which are formed in configurations of layers along a blanking direction of the blanking punch 41. In an area formed correspondingly to the area of the clearance C, a layer of the shearing surface 46a and a layer of the broken surface 47a exist which are formed in configurations of layers along the blanking direction of the blanking punch 41. Here, the layer of the shearing surface 46 is larger than the layer of the shearing surface 46a in its width. The layer of the broken surface 47 is smaller than the layer of the broken surface 47a in its width. Accordingly, a ratio of formation of the layer of the broken surface 47a to the layer of the shearing surface 46a in the area formed correspondingly to the area of the clearance C is larger than a ratio of formation of the layer of the broken surface 47 to the layer of the shearing surface 46 in the area formed correspondingly to the area of the clearance $C_0$.

Since the shearing surfaces 46 and 46a are flat surfaces, lights incident on the shearing surfaces 46 and 46a are reflected toward specific directions determined by directions on which the lights are incident. However, since many microscopic surfaces which are directed to various directions exist in the broken surfaces 47 and 47a, lights incident on the broken surfaces 47 and 47a are irregularly reflected.

Accordingly, in the side part of the through hole of the iron core piece 32, when the lights are respectively incident on an area with a prescribed width having the shearing surface 46a and the broken surface 47a along the circumferential direction and a remaining area having the shearing surface 46 and the broken surface 47, a ratio of existence of the broken surface in the area with the prescribed width is higher than that in the remaining area, so that a difference arises in a state of irregular reflection of the lights (one example of the light reflection characteristics). Accordingly, in the side part of the through hole of the iron core piece 32, the area with the prescribed width having the shearing surface 46a and the broken surface 47a serves as the specific light reflection area 33.

When the iron core pieces 32 are laminated to manufacture the laminated iron cores 31 and 36, on the side surfaces 34 and 37 of the shaft holes of the laminated iron cores 31 and 36, the specific light reflection areas 33 are continuously arranged in the direction of lamination. Accordingly, the lights are allowed to be incident on the side surfaces 34 and 37 of the shaft holes of the laminated iron cores 31 and 36 and the side surfaces 34 and 37 of the shaft, holes of the laminated iron cores 31 and 36 are observed from directions deviating from light reflection directions by the shearing surfaces 46 and 46a. Thus, since the state of the light irregular reflection is distinguished in a range where the specific light reflection areas 33 are continuously arranged along the direction of lamination, bright striped patterns 35 and 39 are recognized which have substantially the same width as that of the specific light reflection area 33.

Thus, in the laminated iron core 31, when the angular positions of the striped patterns 35 in the circumferential direction which exist in the side surface 34 of the shaft hole of the laminated iron core 31 are examined, the turned and laminated states of the iron core pieces 32 can be easily recognized. In the laminated iron core 36, when the angle of inclination of the striped pattern 39 in the direction of lamination which exists in the side surface 37 of the shaft hole of the laminated iron core 36 is examined, the skew applied to the iron core pieces 32 can be easily recognized. In order to form the specific light reflection areas 33, the recessed part 42 may be merely provided in a part of the inner peripheral surface of the blanking die unit 40 as the blanking tool B. Thus, the blanking die unit 40 can be easily machined.

Further, in the side surfaces 34 and 37 of the shaft holes of the laminated iron cores 31 and 36, a part in which the striped patterns 35 and 39 are generated is merely different from a part in which the striped patterns 35 and 39 are not generated in a ratio of a total area of the shearing surfaces to a total area of the broken surfaces which appear in the side surfaces 34 and 37. A configuration (dimension) does not change. Accordingly, a change of design does not arise due to the change of the configuration. A deterioration of the quality of a product for instance, a weight unbalance which is caused by a collapse of a symmetrical property in rotation) does not occur.

Here, the specific light reflection areas 33 are provided in the side parts of the through holes forming the shaft holes, however, the specific light reflection areas may be provided in side parts of other through holes which form a magnet-insert hole 16 or a cooling hole 17.

The present invention is described above by referring to the exemplary embodiments. However, the present invention is not limited to the structures described in the exemplary embodiment and may include other exemplary embodiments or modified examples which may be considered within a range of matters described in claims.

Further, combinations of component elements included respectively in the present exemplary embodiments, other exemplary embodiments or the modified examples may be incorporated in the present invention.

Further, in the above-described exemplary embodiment, the specific light reflection areas are formed in the outer side part of the iron core piece or the inner peripheral part of the through hole of the iron core piece to recognize the turned or laminated state of the iron core pieces or the skew. However, for instance, when two rows of iron core pieces are taken from one steel plate to manufacture the laminated iron core, the specific light reflection area may be provided, in the iron core piece blanked from a specific row. When three rows or more, or multiple rows of iron core pieces are taken to manufacture the laminated iron core, positions, widths or the number of the specific light reflection areas to be formed can be changed for each of rows (in this case, a striped pattern is formed in such a way that the specific light reflection areas are continuously arranged in a direction of lamination). Thus, which row where the iron core piece forming the laminated iron core is blanked can be identified from the presence or absence of the striped pattern, the position of the striped pattern, the width of the striped pattern or the number of the striped patterns without changing a configuration of the iron core piece for each of the rows. Thus, the laminated iron core having an excellent property can be easily manufactured.

Further, in an example explained in the above-described exemplary embodiments, the turning and laminating operation is carried out that every time a plurality of iron core pieces are laminated, the iron core pieces are turned by 180°. However, a turning and laminating operation may be carried out that every time a plurality of iron core pieces are laminated, the iron core pieces are turned by a prescribed angle other than 180° (a striped pattern is formed in such a way that a plurality of specific light reflection areas are continuously arranged at intervals of prescribed angles in a circumferential direction along a direction of lamination). Otherwise, a turning and laminating operation may be carried, out that every time one iron core piece is laminated, the iron core piece is turned by a prescribed angle (a striped pattern is formed in such a way that the specific light reflection areas are arranged at intervals of prescribed angles along a circumferential direction).

The clearances of the blanking die unit and the blanking punch are suitably set depending on the blanked configuration or the quality of the iron core piece or manufacturing conditions (a blanking speed, a simultaneous blanking of a plurality of iron core pieces or the like). Depth of the recessed part is set so as to meet the above-described conditions.

What is claimed is:

1. A method of manufacturing a laminated iron core, the method comprising:
   providing a first blanking tool which determines a product configuration of a plurality of iron core pieces and a second blanking tool paired with the first blanking tool, wherein a clearance formed between the first and second blanking tools is partly enlarged by providing a recess in a part of a surface of the second blanking tool, the recess being defined by a concavity formed in the part of the surface of the second blanking tool;
   blanking, in a blanking direction, the plurality of iron core pieces from a steel plate with the first and second blanking tools having the clearance provided therebetween,
   wherein, as a result of the blanking, a shearing surface layer and a broken surface layer are formed in layers, along the blanking direction, in a side part of each of the plurality of iron core pieces,
   wherein a ratio of formation of the shearing surface layer to the broken surface layer at a portion of the side part corresponding to a position of the recess during blanking is different from a ratio of formation of the shearing surface layer to the broken surface layer at a portion of the side part corresponding to a position of a portion of the clearance that excludes the recess during blanking,
   the formation of the shearing surface layer and the broken surface layer, at the portion of the side part corresponding to the position of the recess, defining a specific light reflection area having a prescribed width in a circumferential direction of each of the plurality of iron core pieces, the specific light reflection area having different light reflection characteristics from the portion of the side part corresponding to the position of the portion of the clearance that excludes the recess during blanking; and
   laminating a number of the plurality of iron core pieces together to form the laminated iron core such that specific light reflection areas of the number of the plurality of iron core pieces are formed in multiple layers along the blanking direction, wherein, at the recess, the clearance is set to 0.1 t to 0.7 t, with t being a thickness of the steel plate.

2. The manufacturing method according to claim 1, wherein the first blanking tool is a blanking die unit and the second blanking tool is a blanking punch, and
   the recess is provided in a part of an outer peripheral part of the blanking punch to blank out an outer shape of the iron core piece.

3. The manufacturing method according to claim 1, wherein the first blanking tool is a blanking punch and the second blanking tool is a blanking die unit, and
   the recess is provided in a part of an inner peripheral part of the blanking die unit to blank out an inner shape of the iron core piece.

4. The manufacturing method according to claim 1, further comprising laminating the number of the plurality of iron core pieces together so as to align the specific light reflection areas to form a striped pattern on a side surface of the laminated iron core.

5. The manufacturing method according to claim 4, further comprising: providing the number of the plurality of iron core pieces to be generally circular in shape and laminating the number of the plurality of iron core pieces together to form a generally cylindrical laminated iron core, wherein the striped pattern is formed by the specific light reflection areas arranged at intervals of prescribed angles along a circumferential direction of the generally cylindrical laminated iron core.

6. The manufacturing method according to claim 4, further comprising forming the specific light reflection areas in groups arranged consecutively along a direction of lamination to define groups of striped patterns, and arranging the groups of striped patterns at intervals of prescribed angles along the circumferential direction.

7. The manufacturing method according to claim 4, further comprising forming the striped pattern by arranging the specific light reflection areas to be consecutive along a direction of lamination and gradually changing angular positions of the specific light reflection areas in the circumferential direction.

8. The manufacturing method according to claim 4, further comprising forming the striped pattern by arranging the specific light reflection areas to be consecutive in a direction of lamination.

* * * * *